Aug. 8, 1933.  E. DEISTER  1,920,972
VIBRATING SCREEN
Filed Oct. 10, 1928  3 Sheets-Sheet 1

INVENTOR.
Emil Deister
BY
ATTORNEY.

INVENTOR.
Emil Deister
BY
ATTORNEY.

Aug. 8, 1933.  E. DEISTER  1,920,972
VIBRATING SCREEN
Filed Oct. 10, 1928  3 Sheets-Sheet 3

INVENTOR.
Emil Deister
BY
Elwin M. Hulse
ATTORNEY.

Patented Aug. 8, 1933

1,920,972

UNITED STATES PATENT OFFICE 1,920,972

VIBRATING SCREEN

Emil Deister, Fort Wayne, Ind., assignor to Deister Machine Company, Fort Wayne, Ind.

Application October 10, 1928. Serial No. 311,435

9 Claims. (Cl. 209—326)

The invention relates to screening mechanisms in which a screening medium or screen cloth is supported upon a frame that is vibrated rapidly up and down transversely. Heretofore it has not been possible to provide a frame that will withstand the rapid vibration to which it is subjected. Hence the frame is of relatively short life and the mechanism is useful but a relatively short time. The screen cloth wears out and may be replaced without great expense but this is not true of the frame.

The object of my invention is to provide a simple and rigid frame upon which a screen cloth is readily supported and which is durable and of long life.

The invention is illustrated in the accompanying drawings in which

Figure 1:
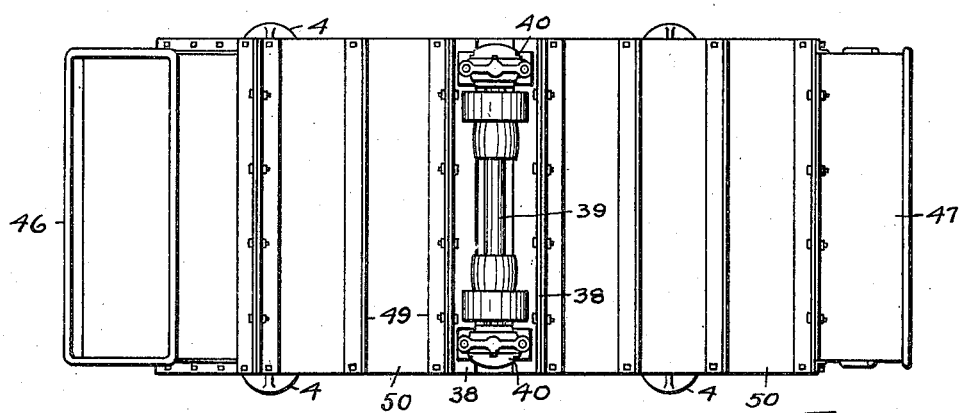
Figure 2:
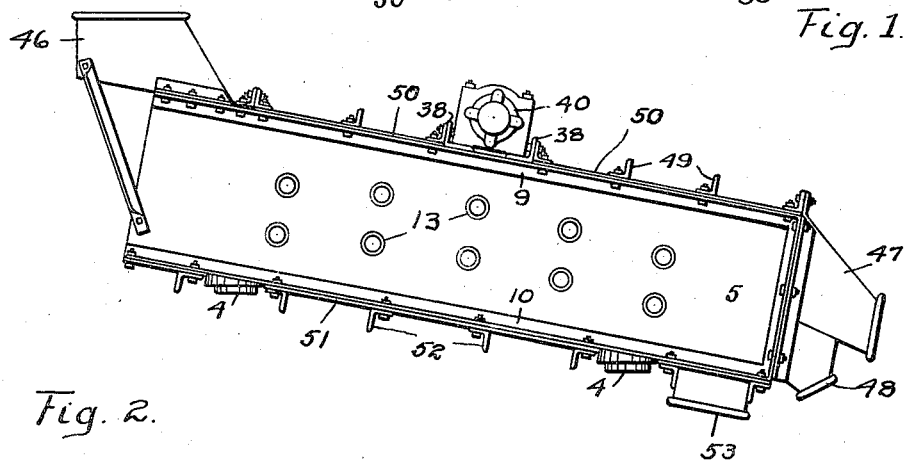
Figure 3:
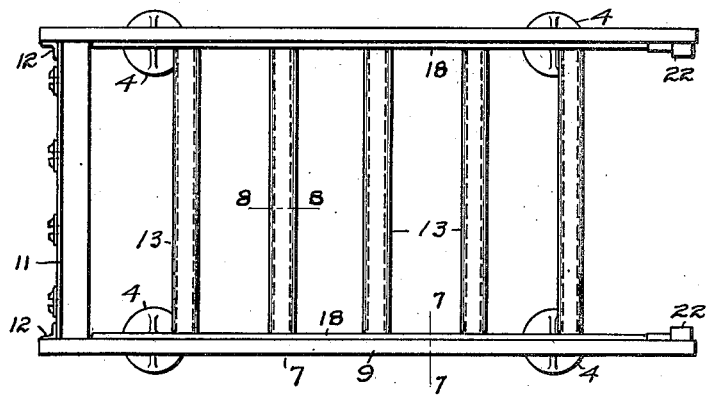
Figure 4:
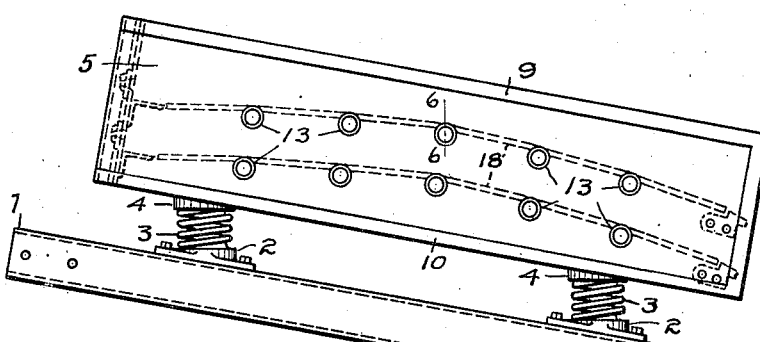
Figures 5, 6, 7, 8, 9:
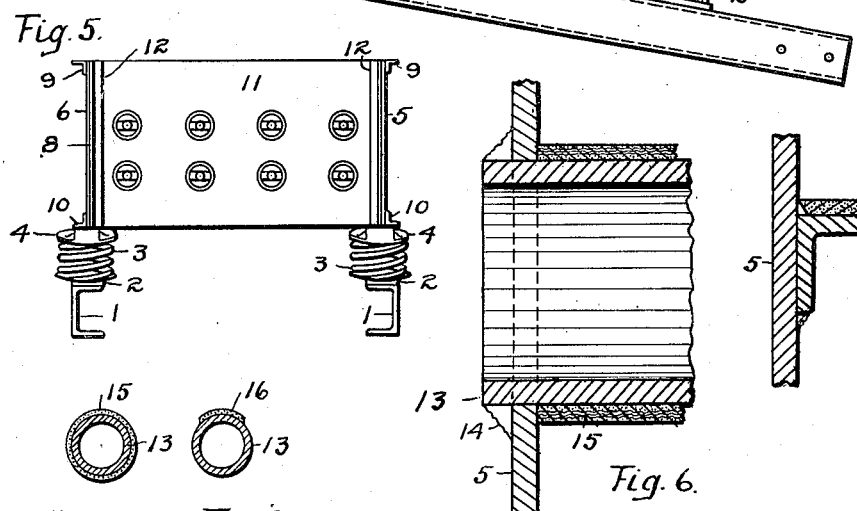
Figure 10:
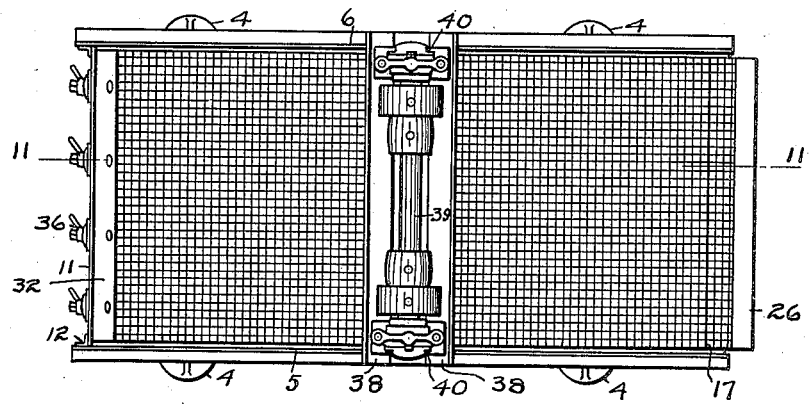
Figure 11:
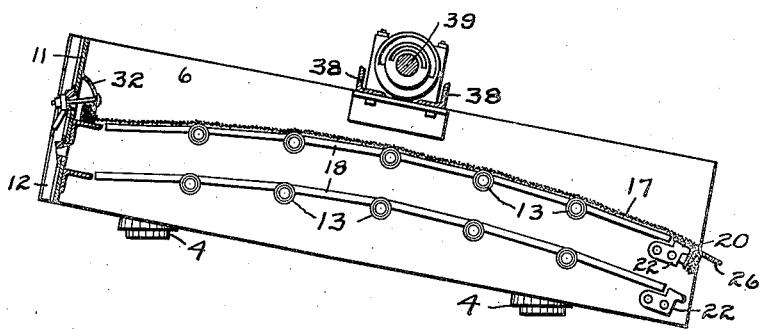
Figures 12, 14:
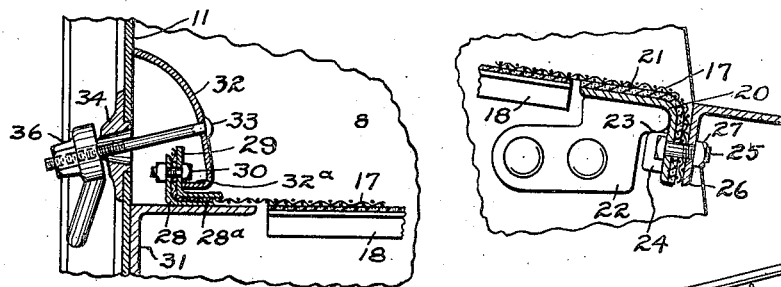
Figure 13:
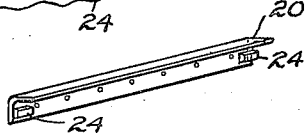
Figures 15, 16, 17:
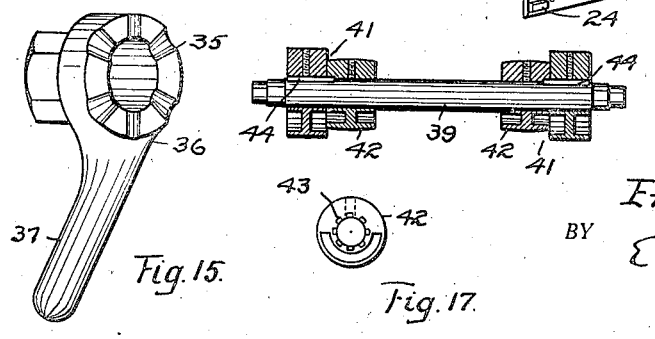

Figure 1 is a plan view of the screening mechanism; Fig. 2 a side elevational view of the same; Fig. 3 a plan view of the frame; Fig. 4 a side view of the frame mounted upon a rigid base; Fig. 5 an end view of the frame; Fig. 6 a cross-sectional view on line 6—6 of Fig. 4; Fig. 7 a cross-sectional view on line 7—7 of Fig. 3; Fig. 8 a cross-sectional view on line 8—8 of Fig. 3; Fig. 9 a cross-section of one of the transverse tubes illustrating a modified form of elastic cushion thereon; Fig. 10 a plan view of the frame with a screen cloth supported thereon; Fig. 11 a cross-section on line 11—11 of Fig. 10; Fig. 12 a detail view of the screen cloth attaching means at the lower or discharge end of the frame; Fig. 13 a perspective view of the screen cloth locking bar; Fig. 14 a detail view of the adjustable attaching means for the screen cloth at the upper end of the frame; Fig. 15 a perspective view of the adjusting lock nut; Fig. 16 a cross-section of the vibration producing mechanism and Fig. 17 a side view of one of the adjustable unbalanced pulleys of the latter mechanism.

In the illustrative embodiment of the invention 1 represents two channels adapted to be rigidly secured in inclined position. Two bosses 2 are secured to the top side of each channel and are adapted to receive the lower ends of the coiled springs 3 that engage the bosses 4 depending from the lower sides of the side members 5 and 6 of the frame 7. The springs 3 therefore resiliently support the frame 7 on the base or foundation members 1 the springs permitting the frame to vibrate freely and unrestricted in all directions.

The side members 5 and 6 are similar each consisting of a plate 8 having an angle bar 9 extending along and welded to its upper outer edge and a similar angle bar 10 extending along and welded to its outer lower edge. A transverse plate 11 extends between the upper ends of the side members 5 and 6 and is rigidly secured to said members by the angle bars 12 that are welded to the plate 11 and to the members 5 and 6 respectively.

Tubes 13 are extended at their opposite ends through the members 5 and 6 and are welded thereto as shown at 14 in Fig. 6, so that they are rigidly connected to the side members and rigidly support those members. Each tube is covered with a suitable cushion, such as a rubber hose 15, or the top side of each tube may have a strip of cushioning material 16 (Fig. 9) secured thereto. In the drawings the frame is designed to support two screen cloths hence there are two sets of tubes 13 one above the other and the tubes of each set are arranged in a selected arc so that the cloth 17 when stretched upon the tubes in said set will curve longitudinally.

Upon opposing faces of the side members 5 and 6 are secured preferably by welding, the guides or guards 18 formed of angle bars. These guides extend between the tubes 13 and the lateral flange of each section of the guides is substantially flush with the top of the tubes. A cushion 19 is secured to the upper side of the lateral flange of each said section. In assembling a screen cloth the guides support the side edges of the cloth and prevent it from sagging between the tubes. After the cloth is stretched the guides continue to support the said side edges and serve as guards to prevent the feed from passing off the cloth at the sides thereof.

As shown in Figs. 11 and 12 the lower or discharge end of the screen cloth is passed over an angle bar 20 the angle of which is convex so as to present no corner to the cloth. A cushion 21 is secured to the surfaces of the bar 20 upon which the cloth engages. The bar 20 rests upon the cleats 22 that are secured to the side members 5 and 6 respectively. Each cleat is under cut to form a shoulder 23 for engagement by a lug 24 formed on the opposed face of the angle bar 20 at the opposite ends thereof. The engagement of the lugs and the cleats prevents turning of the screen cloth. Bolts 25 are passed through the depending flange of the bar 20, through the cushion 21 and the screen cloth and they are extended through the depending flange of an angle bar 26. Nuts 27 on the bolts, when tightened firmly clamp the screen cloth between the two angle bars 20 and 26, and the engagement of the lugs 24 firmly holds the flanges in proper place.

The opposite or upper end of the screen cloth is engaged between two angle bars 28 and 29 by the bolts 30 that extend through the upstanding parallel flanges of the bars 28 and 29. The lateral flange 28a of the bar 28 is slidable upon an angle iron 31 that is welded to the cross plate 11. A plate 32 bears at its upper edge upon the end plate 11 and is curved outwardly and downwardly and a flange 32a at its lower edge engages the upstanding flange of the angle bar 29. A suitable number of bolts 33 extend through the plate 32 and through slotted bosses 34 secured to the end plate 11. The face of each boss about the slot therein is ribbed for engagement by the serrated face 35 of the adjusting nut 36 having a handle 37 thereon, the nut being disposed on the bolt. By rotating the nuts in proper direction the bolts are caused to move longitudinally to exert a pull on the plate 32 and cause its flange 32a to exert a pull upon the screen cloth. It is evident that the more the nuts 36 are tightened against the bosses 34 the more will the screen cloth be stretched. The engagement of the ribs on the bosses in the serrations on the faces of the nuts 36 locks the nuts in adjusted position so that the tension on the screen cloth remains constant.

Any suitable form of vibrating mechanism may be used to vibrate the frame and the screen cloth. I prefer the unbalanced pulley type mounted on a rigid support that is secured at its opposite ends to the top sides of the side members 5 and 6 as shown in Figs. 10, 11, 16, and 17 wherein 38 indicates two angle bars rigidly secured at their opposite ends to the upper edges of the side members 5 and 6. A shaft 39 is revolubly supported in the bearings 40 mounted on the angle bars 38. Two sets of unbalanced pulleys 41 are mounted on the shaft, one of each set being keyed to the shaft and the other 42 (Fig. 17) having a plurality of apertures 43 in one face into any one of which the key 44 may be engaged. Each pulley 42 is therefore peripherally adjustable on the shaft to regulate the degree of vibration of the frame. A belt is engaged on either one of the pulleys 42 and driven by a suitable source of power. The rotation of the shaft and unbalanced pulleys sets up a vigorous vibration in the frame and screening medium or mediums.

In Figs. 1 and 2, I illustrate a closed type of screen in which a hopper 46 is secured to the upper end of the frame for introducing the material to be screened and to the lower end of the frame are secured two discharge spouts 47 and 48, spout 47 being adapted to lead off the oversize materials of the upper screening medium and the spout 48 being adapted to lead off the oversize material of the lower screening medium. A plate 51 is secured to the lower edge of the side members 5 and 6, the plate being reinforced by cross angle bars 52 rigidly secured or welded to the plate. A spout 53 is connected to the plate 51 at a suitable opening therein and discharges the undersize material that falls on the plate.

Plates 50 are secured to the upper edges of the side members 5 and 6, cross angle bars 49 reinforcing said plates.

What I claim is:

1. In a screening mechanism, a frame consisting of spaced side walls and cross supports welded to the side walls, tubular cushions covering the supports, coiled springs to support the frame, a screening medium releasably engaged at one end on the side walls, adjustable means secured to the opposite end of the medium for stretching the medium upon the said supports, and overbalanced means mounted on the frame to vibrate it.

2. In a screening mechanism, a frame consisting of opposite side walls, a series of straight cross supports welded to both said walls, said supports being arranged in a curved plane relatively to the longitudinally axis of the frame, a cushion on each cross support, guards projecting from the opposed faces of said side walls and extending between the cross supports, cleats secured to the side walls adjacent to one end thereof, each cleat being undercut to form a shoulder at one end, a screening medium, a cross member secured to one end of the medium and having lugs thereon engaged under the shoulders respectively, adjusting members having connection with the opposite end of the medium and adapted to stretch the medium upon the cushioned cross supports and the guards, coiled springs under the frame to support the same, and overbalanced means to vibrate the frame.

3. In a screening mechanism, a frame consisting of opposite side walls, a series of straight cross supports welded to both said walls, said supports being arranged in a curved plane relatively to the longitudinal axis of the frame, guards projecting from the opposed faces of said side walls and extending between the cross supports, cleats secured to the side walls adjacent to one end thereof, each cleat being undercut to form a shoulder at one end, a screening medium, a transverse angle bar secured to one end of the medium and having lugs thereon engaged under the shoulders respectively, a pair of angle bars secured to opposite sides of the opposite end of the screening medium, an arcuate plate engaging a wall of one of the latter angle bars and the adjacent end wall of the frame, inclined bolts extended through the arcuate plate and the end wall, rotatable locking members on the bolts cooperating with said end wall to effect longitudinal movement of the bolts and lateral movement of the arcuate plate, coiled springs under the frame and exclusively supporting it and means mounted on the walls of the frame for vibrating the frame and the screening medium.

4. In a vibratory screening mechanism, a base, a screen, coiled springs loosely positioned between said base and screen and springs having axes inclined relative to the horizontal axes of the base and screen for supporting the latter for universal movement, and means carried by the screen for simultaneously imparting longitudinal rotary and rocking movement to said screen.

5. In a vibratory screening mechanism, an inclined base, an inclined screen including a frame supported above said base, substantially vertical coil springs positioned between said frame and base for the sole support of said frame and having axes inclined relative to the horizontal axes of the base and frame, said frame being entirely free on its spring supports for unrestricted movement thereon, and an over-balanced pulley mounted on said frame centrally of its ends for simultaneously imparting unrestrained longitudinal rotary and rocking movement thereto.

6. In a vibrating screening mechanism, a base, a screen including a frame supported above said base, substantially vertical coil springs positioned between said frame and base, said springs having axes inclined relative to the horizontal axes of the base and frame and having a diameter at least equal to the length thereof and constituting the sole support for said frame, whereby the frame will be entirely free on the springs for longitudinal and rocking movement, and means for vibrating said screen in vertical orbits on the springs.

7. In a vibrating screening mechanism, a supporting base, a screen supporting frame above said base, an overbalanced weighted member rotatably mounted on said frame, compression springs disposed between said base and frame and constituting the sole support and restraint for the latter, said springs being longitudinally and transversely yieldable and inclined relative to the horizontal axes of the base and frame, and means for rotating said member whereby to impart an unrestrained vertical and inclined movement to said frame.

8. A screen mechanism including a base, a screen having a frame spaced above the base, an overbalanced weighted member movably mounted on the frame, pairs of members carried by the base and by the frame and disposed in approximate alignment and having confronting seats which latter are arranged in parallel relation and are disposed at any angle to the longitudinal axes of the base and frame, coil springs in the space between the base and frame having their longitudinal axes at an incline to the longitudinal axes of the base and frame and having their ends substantially squared and engaged with the seats whereby the springs are held in their said inclined relation to the base and frame, and means for actuating said weighted member whereby to impart otherwise unrestrained vertical and inclined movement to said frame.

9. A screen mechanism including a base, a screen having a frame spaced above the base, an overbalanced weighted member movably mounted on the frame, coil springs disposed in the space between the frame and base and being arranged to have their longitudinal axes inclined with relation to the longitudinal axes of the base and frame, means carried by the frame and by the base and engaged with the springs to hold the latter in their said inclined disposition, the frame being otherwise unrestrained and means for actuating said weighted member whereby to impart unrestrained vertical and inclined movement to said frame.

EMIL DEISTER.